United States Patent
Vignolo et al.

(10) Patent No.: US 9,211,576 B2
(45) Date of Patent: Dec. 15, 2015

(54) VIBRATION DAMPING SYSTEM FOR A ROLLING MILL WITH FIRST AND SECOND PASSIVE HYDRAULIC ELEMENTS

(75) Inventors: Luciano Vignolo, Udine (IT); Andrea De Luca, Remanzacco (IT); Matteo Nobile, Ruda (IT); Nicola Amati, Turin (IT); Carmine Pristera', Turin (IT); Giuseppe Romeo, Turin (IT); Andrea Tonoli, Turin (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 360 days.

(21) Appl. No.: 13/877,645

(22) PCT Filed: Oct. 7, 2011

(86) PCT No.: PCT/IB2011/054422
§ 371 (c)(1),
(2), (4) Date: Apr. 3, 2013

(87) PCT Pub. No.: WO2012/046211
PCT Pub. Date: Apr. 12, 2012

(65) Prior Publication Data
US 2013/0192324 A1  Aug. 1, 2013

(30) Foreign Application Priority Data
Oct. 8, 2010  (IT) .............................. MI2010A1843

(51) Int. Cl.
*B21B 37/00* (2006.01)
*B21B 38/00* (2006.01)
*F16F 15/027* (2006.01)

(52) U.S. Cl.
CPC ............. *B21B 37/007* (2013.01); *B21B 38/008* (2013.01); *F16F 15/027* (2013.01)

(58) Field of Classification Search
CPC .... B21B 37/007; B21B 37/62; B21B 38/008; B23Q 11/0032; B23Q 11/0039
See application file for complete search history.

(56) References Cited

U.S. PATENT DOCUMENTS

| 3,686,907 A | 8/1972 | Sokolov et al. |
| 5,724,846 A | 3/1998 | Wang et al. |

FOREIGN PATENT DOCUMENTS

WO   WO2010063664   6/2010

OTHER PUBLICATIONS

International Search Report and Written Opinion for International Application No. PCT/IB2011/054422.

*Primary Examiner* — Debra Sullivan
(74) *Attorney, Agent, or Firm* — Stetina Brunda Garred & Brucker

(57) ABSTRACT

The present application relates to a vibration damping system for a rolling mill comprising a rolling cage and a bending adjustment system (3,3') of the rollers comprising hydraulic actuators acting on the rollers and hydraulic circuits (18, 19) for feeding, and hydraulic damping means (25, 31, 32) of a force connected to the hydraulic circuits (18, 19) for actuating a damping effect by means of the hydraulic actuators. The hydraulic damping means comprises a pair of hydraulic pumps (25B, 25C) or a pair of hydraulic cylinders with a dual chamber, connected in an opposite direction to each other to the hydraulic circuits (18, 19).

8 Claims, 10 Drawing Sheets

VIBRATION DAMPING SYSTEM FOR A ROLLING MILL WITH FIRST AND SECOND PASSIVE HYDRAULIC ELEMENTS

FIELD OF THE INVENTION

The present invention relates to a vibration damping system for a rolling mill.

PRIOR ART

In the cold rolling of tapes, rolling cages are used comprising at least one pair of rolling cylinders called 1 and 1' which are in direct contact with the tape during the rolling; see FIG. 10a in the technical note. One of the two rollers is vertically above the other one.

This arrangement is limited in terms of the forces that can be applied for the elastic deformation of said cylinders. To solve this problem, cages are used comprising more rollers or cylinders, at least two of which are rollers, and two of which are support rollers or cylinders that oppose the elastic deformation of the rollers that are intended to be in direct contact with the material to be rolled.

Other arrangements are known in the prior art, in which two cylinders are used for rolling, with two intermediate cylinders and two cylinders for support.

In addition, arrangements with more rollers are also known.

Each rolling cage is equipped with several hydraulic actuators, including:
 two hydraulic cylinders placed, for example, on the top of the cage or underneath the cage, and acting on the support fittings to control the distance between the rollers and consequently to control the thickness of the tape being rolled;
 four or more hydraulic bending cylinders for each fitting of the rollers, defining a so-called bending control system which, by acting on the roller fittings, modify its elastic deformation to permit the control of the flatness of the tape being rolled.

The rolling force is applied on the necks of the support cylinders to control the thickness of the tape being rolled, while additional forces are applied, via the bending control system, to the roller fittings in order to control the flatness of the tape being rolled.

Additional bending systems are known with the following names:
 "Mae West" with hydraulic positive bending cylinders inserted into support blocks, with negative bending cylinders installed in the fittings of the supports;
 E block, with positive bending cylinders and negative bending cylinders inserted in the same block;
 C block cylinders suited to performing both positive and negative bending.

The bending system is controlled by servo valves that control the pressure in the chambers of the hydraulic bending cylinders in order to achieve the desired amount of elastic deformation of the rollers.

The servo valves that control the bending of the cylinders have response times in the order of 50 to 200 ms with cut-off frequencies below 50 Hz.

In cold rolling, cooling and lubrication systems are used in order to remove the heat generated during the cold rolling, while at the same time lubricating the rolling space by preventing direct contact between the tape and the roller.

Such cooling and lubrication systems can use oil and water emulsions or alternatively pure oil; the choice of the product and the type of cooling and lubrication system depends on the characteristics of the product to be rolled and the quality/surface finish of the tape that it is desired to obtain.

The rolling speed defines the capacity of each individual rolling mill; all rolling mills generally attempt to roll for the longest time possible at speeds close to the maximum speeds achievable by the powertrain and permitted by the power installed in the system.

During the rolling, forces may be generated that, under certain conditions, may trigger resonances, primarily in the vertical arrangement direction of the rollers. These forces may be generated by the following effects:
 The tape itself, due to its intrinsic variations in thickness or hardness;
 Variations in the friction of the roller space, especially when it reaches maximum speeds, with the risk of even temporary breakage of the lubrication film;
 Defects induced in the rollers during adjustment operations;
 Unsuitable conditions of the cage mechanics, such as wear, play between the various components and damaged antifriction bearings.
 The simultaneous rolling of hard material accompanied by a marked reduction in thickness and a high rolling speed.

The rolling cages, like every mechanical component, have their own resonance frequencies. If said forces have frequencies close to or coincident with said own resonance frequencies, vibration phenomena may be induced.

Such phenomena are manifested in a movement of the rollers, in the direction transverse to the rolling direction, i.e. they occur in the vertical direction and can reach uncontrollable amplitudes that are not suited to the rolling process.

Such phenomena are termed chatter and can create surface defects such as light/dark markings on the tape or variations in thickness that lead to the rejection of the rolled tape, whereby the defects depend on the mode of vibration of the cage.

Usually, in order to prevent defects or breaking of the tape being rolled, that can cause damage to the rolling cage, the person controlling the rolling process who notes a chatter phenomenon reduces the rolling speed or applies procedures for damping this phenomenon.

In the prior art, two main types of chatter are known, which are called the third and fifth octaves.

Resonance of the third octave occurs at frequencies between 100 and 200 hertz, while resonance of the fifth octave occurs at frequencies between 500 and 700 hertz.

Such phenomena are characterized by different modes of vibration: a resonance of the third octave induces a first mode of vibration in which a roller and its associated support move in unison, while the upper and lower cylinders vibrate in phase opposition to each other; a resonance of the fifth octave induces a second mode of vibration, in which the rollers vibrate while the support cylinders are stationary.

When these resonance phenomena occur during the rolling, the rolling speed can be reduced by 20 to 50% of the design speed of the rolling mill.

Chatter is therefore a significant problem for the operation of rolling mills, because in addition to causing the rejection of the product, it significantly reduces production capacity.

In view of the significance of the problem, the phenomenon of chatter in rolling has been the subject of intense study and experimentation.

Through the application of vibration sensors or velocimeters, conveniently mounted on rolling cages, it is possible to detect and signal the onset of a resonance phenomenon in order to bring forward the slowdown of the rolling mill as far as possible.

Such systems are currently used in a fully automatic mode and permit a constant and continuous monitoring of the vibration level of the rolling mill, which is also of benefit to the preventive maintenance plans of the mill.

Such systems permit the minimization of quality rejections, but do not resolve the problem related to the reduction of production capacity of the rolling mill.

One subject of study has been the creation of systems for the active or passive damping of vibrations, in order to permit rolling at speeds that are always closer to the design speeds of the rolling mills.

JP05104117 describes a damping system consisting of a ground and a spring installed at the top of a rolling cage. The natural frequency of the ground-spring assembly, is equal to that of the rolling cage, so as to generate an anti-resonance. Such a solution is not satisfactory because, on varying the dimensions of the rollers used in the rolling mill, the natural frequency also varies, even if slightly, and this also leads to the intervention on the anti-resonance system. In addition, the contribution of the anti-resonance system leads to the emergence of two new resonance frequencies, with the risk that the chattering phenomenon will also begin.

JP 10314816 describes a damping system similar to that described in JP05104117.

JP08247211 describes a dynamic damper system that is able to adapt to variations in the natural frequencies during the operation of the rolling mill. The disadvantage of such a system is that it is positioned at the top of the cage and is therefore very distant from the rollers that act directly on the rollers during rolling. The hysteresis of the rolling cage is such as to nullify the expected damping effect. In addition, JP08247211 does not describe the type of actuator, and does not give sufficient information for the concrete implementation of the damping system. JP09174122 describes a damping system based on the insertion of hydraulic dampers between the fittings of the upper and lower rollers, but this solution is limited due to the limited capacity of the dampers to follow high-frequency vibrations. In addition, said dampers have a negative effect on the rolling tolerances in the absence of the chatter phenomenon.

U.S. Pat. No. 5,724,846 describes a procedure for introducing an asynchronous vibration into the system for checking the gap between the rollers, or into the balancing cylinder of the support cylinder.

U.S. Pat. No. 5,724,846 does not describe how to generate these asynchronous vibrations at frequencies from 100 to 700 Hz; on the other hand, U.S. Pat. No. 5,724,846 suggests intervening on actuators placed at a specific distance from the tape being rolled, with a relatively low capacity to dampen the vibration phenomena.

In addition, U.S. Pat. No. 3,686,907 and WO2010/063664 disclose damping devices according to the preamble of claim 1.

Depending on the vibration modes, the type of defects induced in the tape being rolled changes. In particular, said defects depend on the type of the vibration class and the frequency; namely, waves are generated on the upper and lower surfaces of the tape that can be in unison or out of phase by one half of an oscillation cycle. In the best cases, such defects lead to the rejection of the portion of the tape affected by the vibration.

Thus, the technical problem to be resolved is to identify a system and a method for attenuating or eliminating the resonance vibrations during a rolling process.

SUMMARY OF THE INVENTION

The object of the present invention is to provide a system for damping the resonance vibrations in a cold rolling mill that is suited to solving the above problem.

The object of the present invention is a system for damping the vibrations of a rolling mill that, according to claim 1, comprises a rolling cage having rollers and bending control system for the rollers comprising
hydraulic actuators acting on said rollers to control the position of the rollers to each other,
hydraulic feeding circuits for said hydraulic actuators,
means of hydraulic damping of a force, said means being connected to said hydraulic circuits to actuate a damping through said hydraulic actuators;
characterized in that
said hydraulic damping means comprise
a first passive hydraulic element comprising a respective moving part, connected between said hydraulic feeding circuits,
a second passive hydraulic element comprising a respective moving part, connected between said hydraulic feeding circuits, in an opposite direction to said first passive hydraulic element,
a first elastic element connecting said respective moving parts of the first and second passive hydraulic elements to each other,
at least one electrodynamic damping device rigidly connected to one of said moving parts of said first or second passive hydraulic elements.

Preferred variants of the invention relate to active and passive damping systems. An active system is understood to mean a damping system that electrically feeds the at least one electrodynamic actuator based on a feedback signal taken from the system, for example a measurement of a displacement or a displacement speed of the rollers and, vice versa, a passive system is understood to mean a damping system, the action of which does not provide for the electrical feeding of the at least one electrodynamic device.

Said first and second passive hydraulic elements may comprise a pair of hydraulic pumps or a pair of hydraulic cylinders with a dual chamber connected in an opposite direction to the feeding circuits of the system for controlling the flatness of the rollers and in which said at least one electrodynamic damping device is connected to one of said passive hydraulic elements to dampen the vibrations of the rolling cage.

Since the hydraulic pumps are connected to each other in opposite directions, their respective rotors, as a result of a pressure difference between one feeding circuit and the other, tend to rotate in a contrary direction to each other. Therefore, since the rotors are connected to each other, through a torsion spring, such rotations are prevented until the pressure difference has a low frequency.

Similarly, the dual-chamber hydraulic cylinders are connected to each other, by the moving shafts, through a spring, in order to balance a pressure difference between the positive control circuit and the negative control circuit of the rolling flatness.

The electrodynamic damping device, in the case of hydraulic pumps, is a motor, whereas in the case of hydraulic cylinders, it is a piezoelectric actuator.

According to the present invention, therefore, a damping of the resonance force is actuated through the hydraulic circuits of the system for controlling the flatness of the working rollers (bending). This involves, advantageously, the application of a reaction in the immediate vicinity of the rollers, with a definite qualitative result in the rolled tape, in view of the rolling speeds that are close to the design speeds.

The connection between the rotors of the pumps and the electric motor is also implemented rigidly, for example, by means of a joint. Such a joint is connected to the ground via an elastic element, for example a torsion spring. In this way, a torsional ground-spring-damper system is created which, as its inertia, has the rotor of the motor and the rotor of the pump, which is resonant with respect to the vibrations of the rolling cage.

In addition, advantageously, provision can be made for the integration of one of the above variants in a system for controlling flatness through the controlled bending of the working cylinders (bending).

Advantageously, the automatic control system of the rolling process of a rolling mill can be adapted to also control the damping system that is the object of the present invention.

The present invention can be advantageously applied to existing rolling mills, for which reason a further object of the present invention is to provide a vibration damping kit for a rolling mill that is suited to resolving the above problem.

Another object of the present invention is a vibration damping kit for rolling mills according to claim 8.

Another object of the present invention is to provide a rolling mill capable of working at rolling speeds close to the design speeds, without presenting the phenomena of chatter.

Another object of the present invention is a rolling mill according to claim 9.

The dependent claims describe preferred embodiments of the invention, forming an integral part of the present description.

BRIEF DESCRIPTION OF THE FIGURES

Further characteristics as well as further advantages of the present invention will become apparent from the following detailed description of the preferred, but not exclusive, embodiments of a system for damping the resonance vibrations of a rolling mill, in particular a cold rolling mill, as shown in the annexed drawings, which are supplied by way of non-limiting example, wherein.

The same numbers and the same reference letters in the figures identify the same elements or components.

DETAILED DESCRIPTION OF A PREFERRED EMBODIMENT OF THE INVENTION

Figure 4:
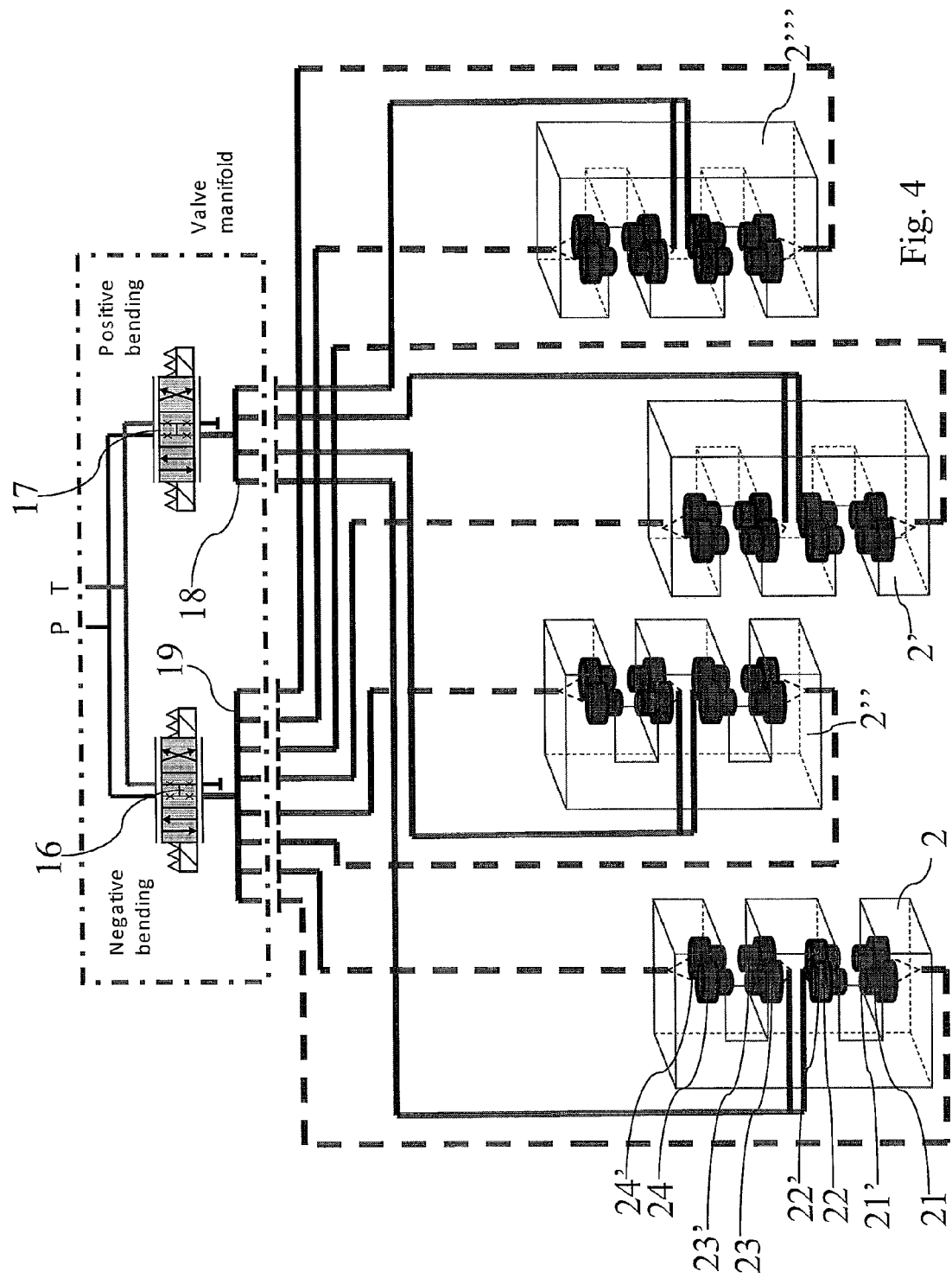
FIG. 4 shows a bending control circuit using servo valves to control the positive and negative bending to which the present invention relates.

With reference to FIG. 4, we schematically show a system for controlling the flatness through the controlled bending of the working cylinders (bending) of the E-block type, showing the hydraulic circuits that determine the movement of the cylinders to which the present invention is applied. In particular, the dotted lines show the actuation circuits of a negative bending, i.e. that leads to a mutual approaching of the rollers to each other. The solid lines show the actuation circuits of a positive bending, i.e. that leads to a mutual distancing of the rollers from each other. The two opposing support blocks hold the fittings of two rollers on the same side.

Figure 1:
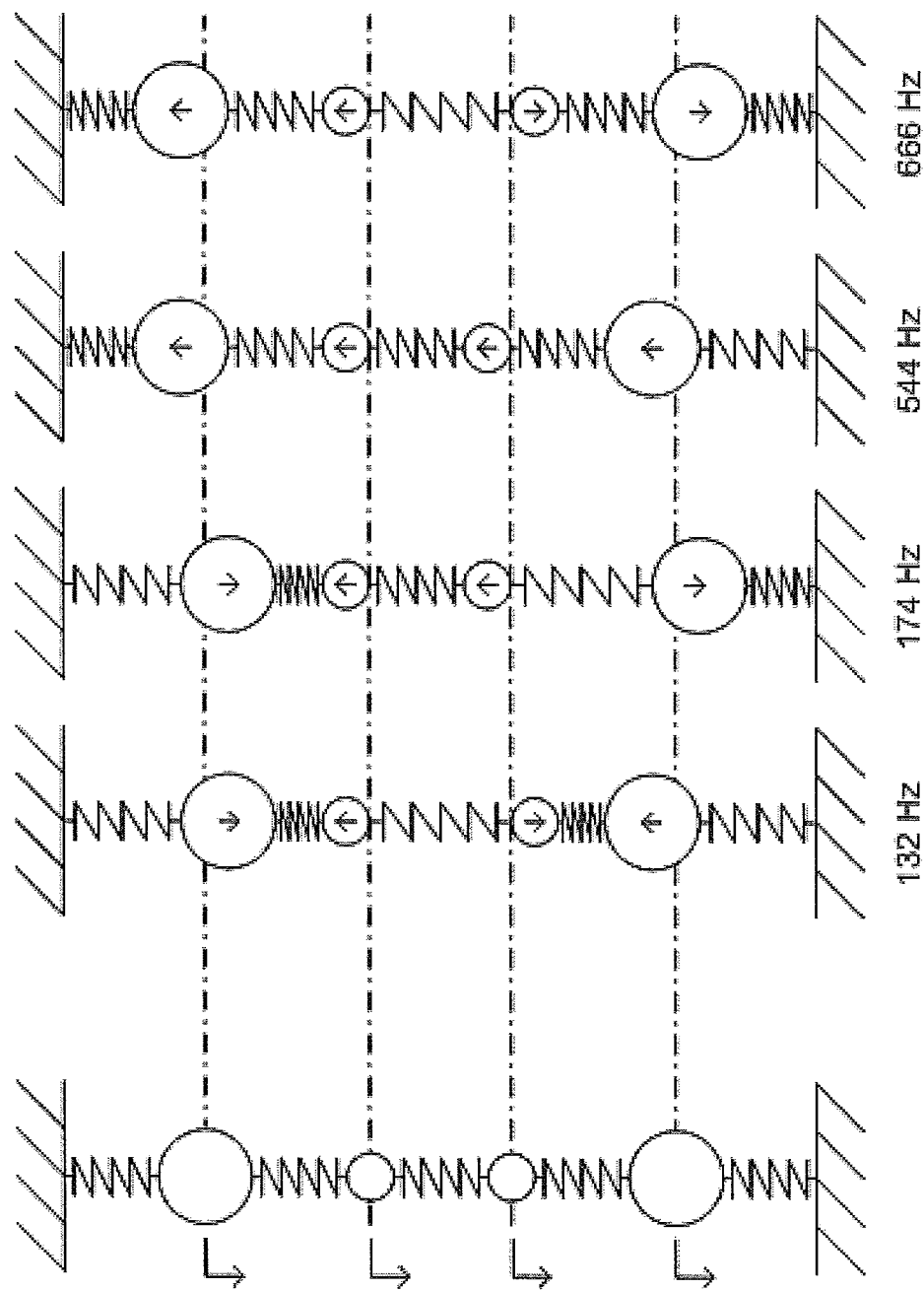
FIG. 1 shows the vibration modes of a rolling cage when the present system is disabled.

With reference to a cage according to FIG. 1, a simplified dynamic model of such a cage is shown. This shows typical vibration modes of the cage at different frequency values: in particular, in the example, the vibration modes are obtained for frequencies of 132, 174, 544 and 666 Hz, which depend on the dimensional and elastic characteristics of the cage in question. Thus, by varying the parameters of mass, elastic rigidity and damping, the natural resonance frequencies change, from which it is implied that each roller system has its own resonance frequencies.

Thanks to the present invention, regardless of the transient or steady state conditions that generate the instability, the force Fv is cancelled out by the effect of the opposite damping Fs.

Figure 2:
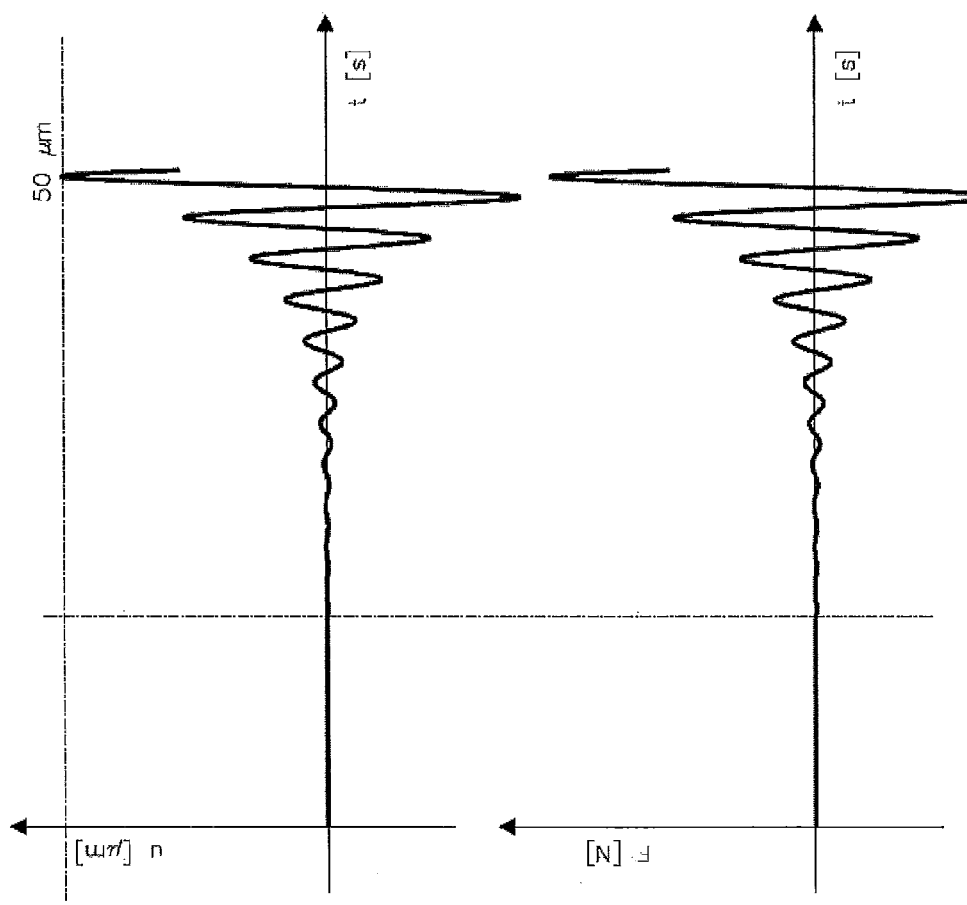
FIG. 2 shows two graphics representing, respectively from above, a variation in thickness of a tape rolled over time and a trend of a force over the same time that determines said variation in thickness; a vertical dotted line identifies a point in time at which the phenomenon begins, and a horizontal dotted line identifies a breaking limit of the tape.

FIG. 2 shows an example of resonant vibration of the third octave when the damping system is disabled; in particular, the upper graphic of the figure shows a variation in the thickness tolerance that, at the point when the chatter begins, indicated by a vertical dotted line, begins to emerge from the optimal conditions indicated by a band generally of +/−2 µm, due to which the thickness becomes unstable because the resonance occurs at a higher frequency than the bandwidth of the system for controlling the flatness of the rolling mill. The lower graphic shows a trend in the force that induces such variations in tolerance.

Therefore, the thickness of the tape undergoes changes that can reach and exceed +/−50 µm, with the risk of breaks in the tape.

In addition, FIG. 1 shows schematically the vibration modes of a rolling cage comprising two rollers and two single support rollers when the present damping system is disabled.

Numerous tests have shown it to be highly advantageous to apply said damping to elements as close as possible to the tape being rolled, which confirms that the solution offered by the present invention achieves the above objects, through the integration of a vibration damping device into the device for controlling the bending of the rollers, i.e. in the system for controlling the flatness of the working rollers (bending).

Figure 5:
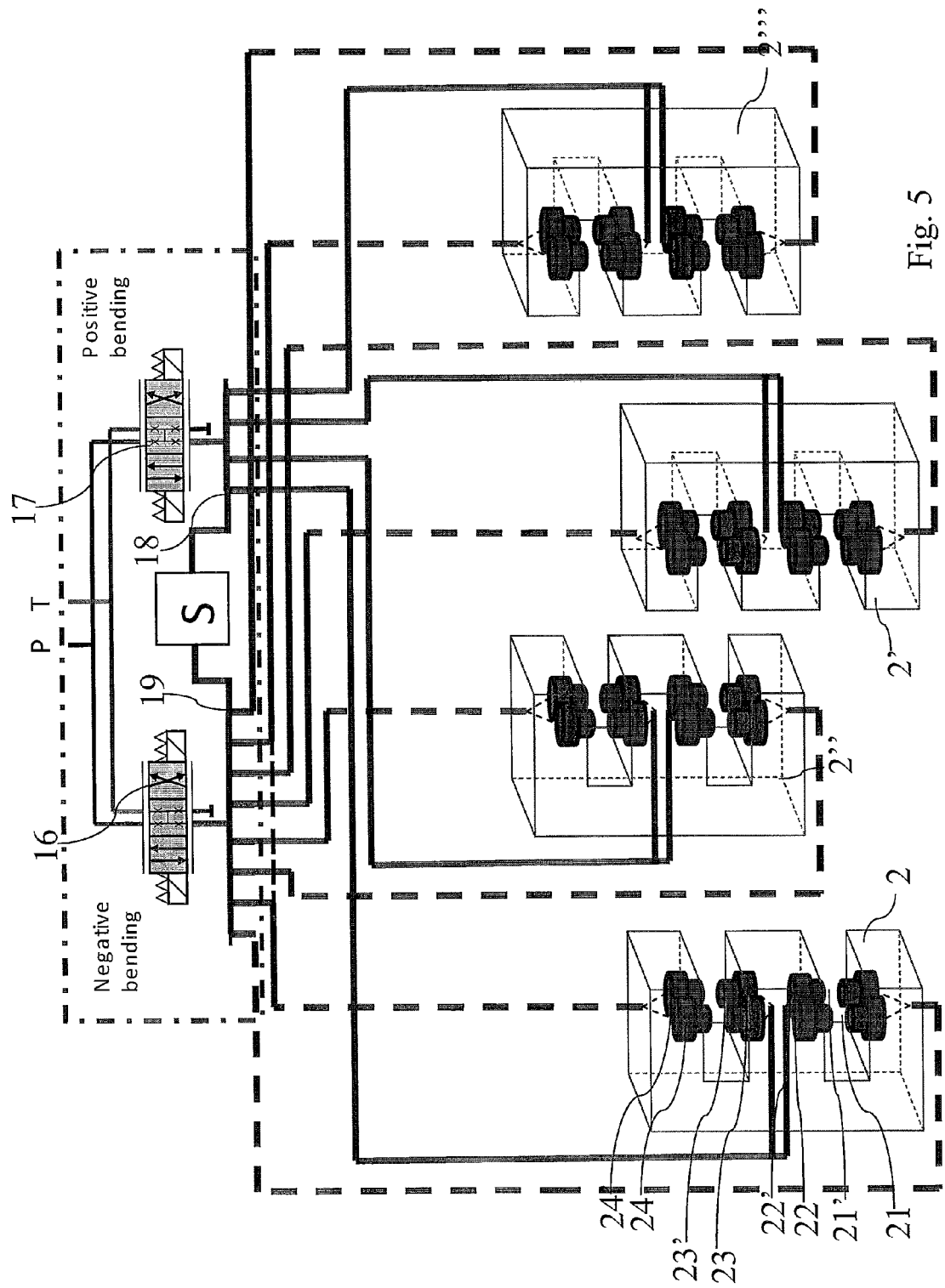
FIGS. 5 and 6 show schematically, according to the present invention, variants of the present invention, in which respectively a single damping system is connected to the bending control system or a control system is provided for each support block of the fittings of the rollers.
Figure 6:
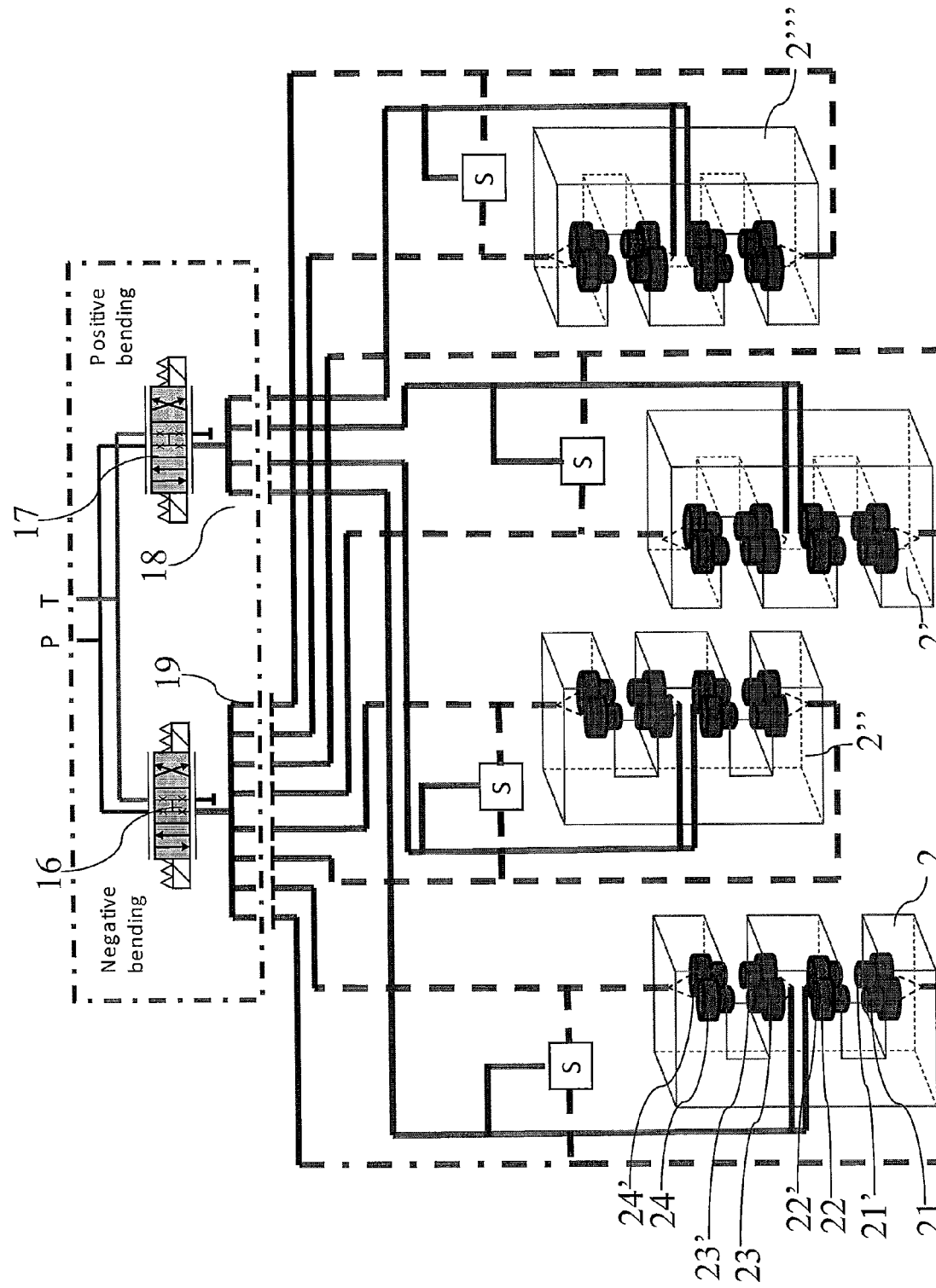

With reference to the E-block arrangement (see FIG. 4), four pairs of support elements 2, 2', 2" and 2''' each define an E. Said E-shaped support elements are placed opposite to each other two by two, such that the legs of one E are facing the legs of the other E. With reference to FIGS. 4, 5 and 6, between the cavities defined by said E blocks are inserted ends 3*a*, 3*b* and 3'*a*, 3'*b* of fittings 3 and 3' of the rollers 1 and 1'. Similarly, this occurs for both ends of the rollers in relation to the blocks 2, 2' and 2" and 2'''. Within the cavities of each E-shaped block are hydraulic actuators 21, 21' and 22, 22' and 23, 23' and 24, 24'. The first four act on said second roller 1', while the second four act on said first roller 1.

In particular, the movement of the hydraulic actuators is co-ordinated such that the raising of the first roller 1 corresponds to the lowering of the second roller 1' and vice versa. Thus, the pairs of actuators 21, 21' and 24, 24' work in a co-ordinated manner with each other in the same direction of mutual approach/distancing, while the pairs 22, 22' and 23, 23' work in a co-ordinated manner with each other in the same approach/distancing.

The movement of said actuators can be implemented through two separate manifolds 18 and 19 for feeding the hydraulic circuits that connect a hydraulic pump (not shown) through appropriate servo valves 16 and 17. See FIGS. 4, 5 and 6.

The manifold 18 is connected with hydraulic circuit branches, show by the dotted lines, for a positive control of bending, while the manifold 19 is connected with hydraulic circuit branches, shown by the solid lines, for negative control of bending.

This system for controlling the flatness of the working rollers (bending), therefore, by means of servo valves 16 and 17, control the pressure in the active chamber of the hydraulic cylinders 21, 21' and 22, 22', 23, 23' and 24, 24' with pressure sensors that generate signals used in the closed loop of the flatness control system of the working rollers (bending).

Said servo valves 16 and 17 thus connect the two manifolds 19 and 18 to a high-pressure pipe P fed by said hydraulic pump (not shown) or by a low-pressure pipe T. From the symbols shown on the servo valves shown in the drawings, their function is clear to the person skilled in the art.

Said servo valves have frequency responses that are not compatible with the resonant frequencies that it is desired to attenuate.

According to the present invention, a damping action is actuated through said hydraulic circuits for controlling the bending by acting appropriately on the hydraulic actuators for controlling the bending.

According to a preferred embodiment of the invention, said damping system S is connected between the manifolds 18 and 19 for feeding said hydraulic actuators for controlling the bending (see FIG. 5), while, according to another preferred variant shown in FIG. 6, a damping system S is provided that is connected in the immediate vicinity of each support block 2, 2', 2", 2"' between the positive and negative bending pipes.

The present invention lends itself appropriately to the retrofitting of existing rolling mills, because the pre-existing bending control system continues to function as designed, without being affected by the high-frequency functioning of the vibration damping system.

With the help of FIGS. 6, 7, 8 and 9, we describe some variants of the invention in detail. These figures refer schematically to only one side of the rolling mill with reference to the supports 2-2' or 2"-2"', but it is understood that the solution can be applied to both sides of the rolling cage. In addition, the hydraulic connections shown by the dotted lines refer to the positive bending control.

First Variant

According to a first passive variant of the invention (see FIG. 7), a first electro-hydrostatic actuator 25 is connected between the above manifolds 18 and 19.

Said electro-hydrostatic actuator comprises a first hydraulic pump 25B connected hydraulically between said manifolds 18 and 19 and connected to the rotor of an associated motor 25A slaved to the pump through a rigid connection, for example a joint. An elastic element 33, for example a torsion spring, is connected between said joint and grounding part.

As a result, this elastic element is in parallel with the connection joint between the electric motor 25A and the hydraulic pump 25B.

A second hydraulic pump 25C is connected hydraulically between said manifolds 18 and 19 in the opposite direction to the first hydraulic pump, i.e. so that its rotor rotates in the opposite direction to said first hydraulic pump 25B when subjected to the same pressure wave that propagates from one manifold to the other. An additional torsion spring 32 connects the rotors of the two hydraulic pumps 25B and 25C. The windings of the electric motor 25A are connected to a passive electrical load, preferably a resistive-inductive circuit 31, preferably having variable impedance.

The mechanical connection created by means of said second torsion spring 32 determines that the two rotors are rigidly connected by low-frequency pressure waves and are independent for pressure waves at high frequencies.

This arrangement permits the maintenance of different pressures between the manifolds 18 and 19 when a positive or negative bending is imposed on the rolling mill, in which it is possible to detect pressure differences in the order of 200 bar or more between the two hydraulic manifolds 18 and 19.

At high frequency, i.e. when the onset of chatter phenomena occurs, the two rotors are independent, so the movements of the rotor 25B, which is rigidly connected to the rotor of the electric motor 25A, are damped by the eddy currents that are generated in the same electric motor 25A. Thus, the motor 25A acts as a damper. Said eddy currents create a torque that opposes the rotations of the rotor, thus resulting in a damping effect actuated by the hydraulic bending control circuits/manifolds 18 and 19.

In this way, the inertia of the damper 25A and of the pump 25B become a resonant system with respect to the spring 33 connected to the ground.

This variant can provide for the windings of the motor 25A being able to be closed in a short-circuit or connected to a suitable passive variable resistive-inductive circuit 31, in order to adapt the damping response to the dynamic characteristics of the rolling cage which may, for example, change in relation to the material being rolled, the rolling speed, the dimensions of the rollers and/or the support, their masses, etc.

Since the motor 25A is not supplied by any external power source, it defines a passive arrangement of the damping device that is the object of the present invention.

Second Variant

Figure 8:
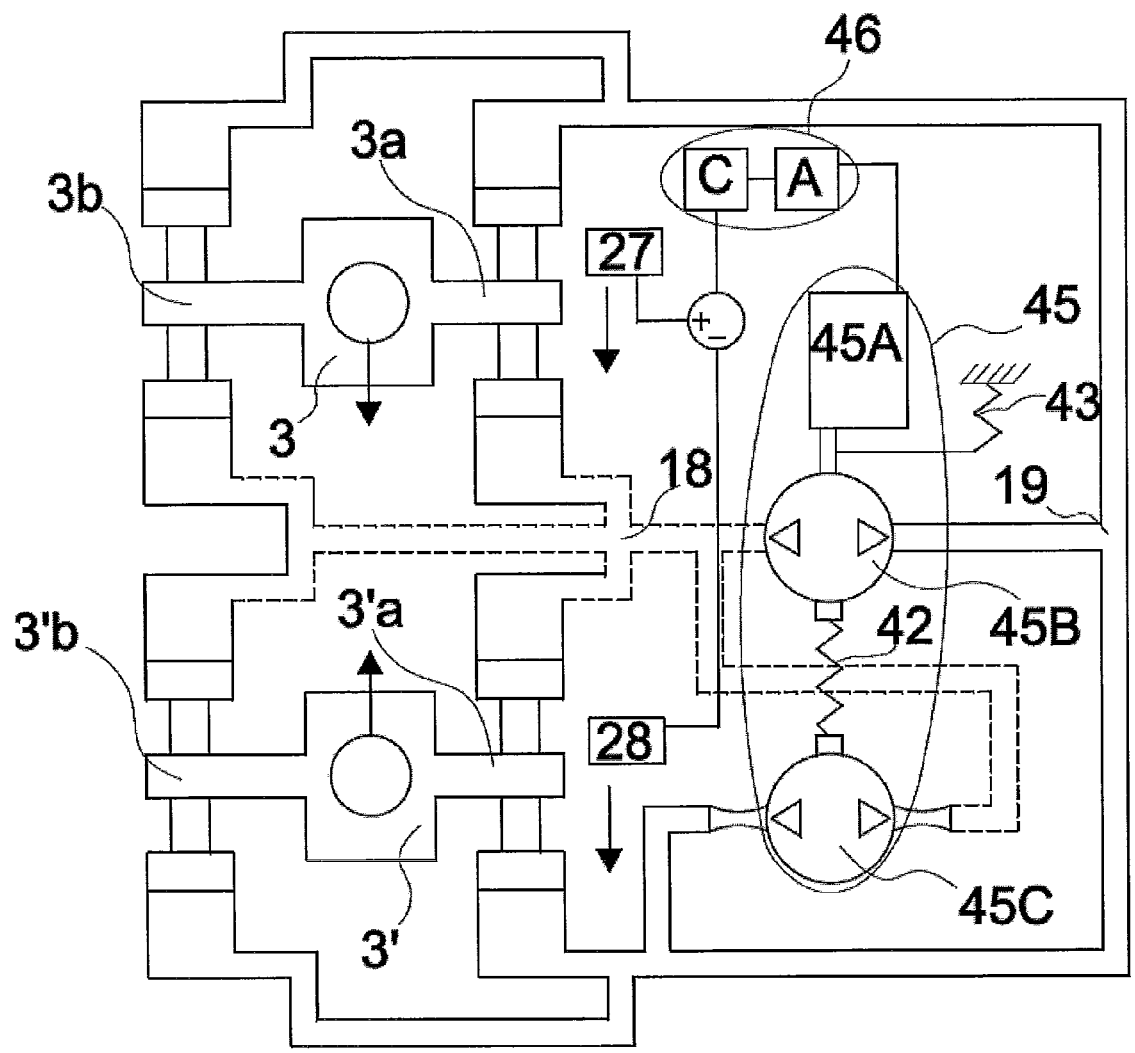

With reference to FIG. 8, at least one electro-hydrostatic actuator 45 comprising an electric motor 45A is connected to a pump 45B through a rigid joint. The pump 45B is connected hydraulically between said manifolds 18 and 19.

It defines an active arrangement of the damping system, because the electric motor 45A is supplied to dampen the chatter.

In addition, an elastic element 43 is connected between said rigid joint and the ground, for example a first torsion spring 43.

The present variant is comparable to the previous variant with regard to the hydraulic and mechanical part, in which a first hydraulic pump 45B is connected hydraulically between said manifolds 18 and 19, and a second hydraulic pump 45C is connected hydraulically between said manifolds 18 and 19 in the opposite direction to the first, i.e. such that its rotor rotates in the opposite direction to the first hydraulic pump 45B when subjected to the same pressure wave that propagates from one manifold to the other. A second torsion spring 42 connects the rotors of the two hydraulic pumps 45B and 45C.

Velocimeters 27 and 28 measure the movement/speed of the fittings of the rollers 1 and 1' and the respective signals are used by a controller C and possibly amplified by a signal amplifier A to power and control said electro-hydrostatic actuator(s) 45 in order to generate a damping action Fs that cancels out said force Fv. Therefore, this variant is active.

In particular, the velocimeters 27 and 28 are installed, for example, on the fittings 3 and 3' of the rolling cylinders 1, 1', to measure their speed of vibration in three co-ordinated directions. Particular attention is given to the vertical component with respect to the rolling plane. Such speed measurements generate an error input for the control system 46 comprising said controller C and said amplifier A, which generates a control signal and power of the electric motor 45A slaved to the hydraulic pump 45B.

Also in this case, a damping action is actuated through the circuits of the hydraulic actuators of the system for controlling the flatness of the working rollers 1, 1' (bending).

In addition, the inertia of the damper represented by the electrical motor 45A and the pump 45B behave as a resonant system with respect to the spring 43 connected to the ground.

In addition, the present variant, operating at higher frequencies than the cut-off frequencies of the servo valves 16 and 17 for controlling the bending, means that the damping action does not interact with the bending control.

Thus, the hydraulic bending actuators 21, 21' and 22, 22' and 23, 23' and 24, 24' are simultaneously controlled by the bending control system and by the control system 46 by means of said electro-hydrostatic actuator 45 in a so-called active arrangement.

Third Variant

A passive variant, not shown, is intermediate with respect to the two previously described variants.

Figure 7:
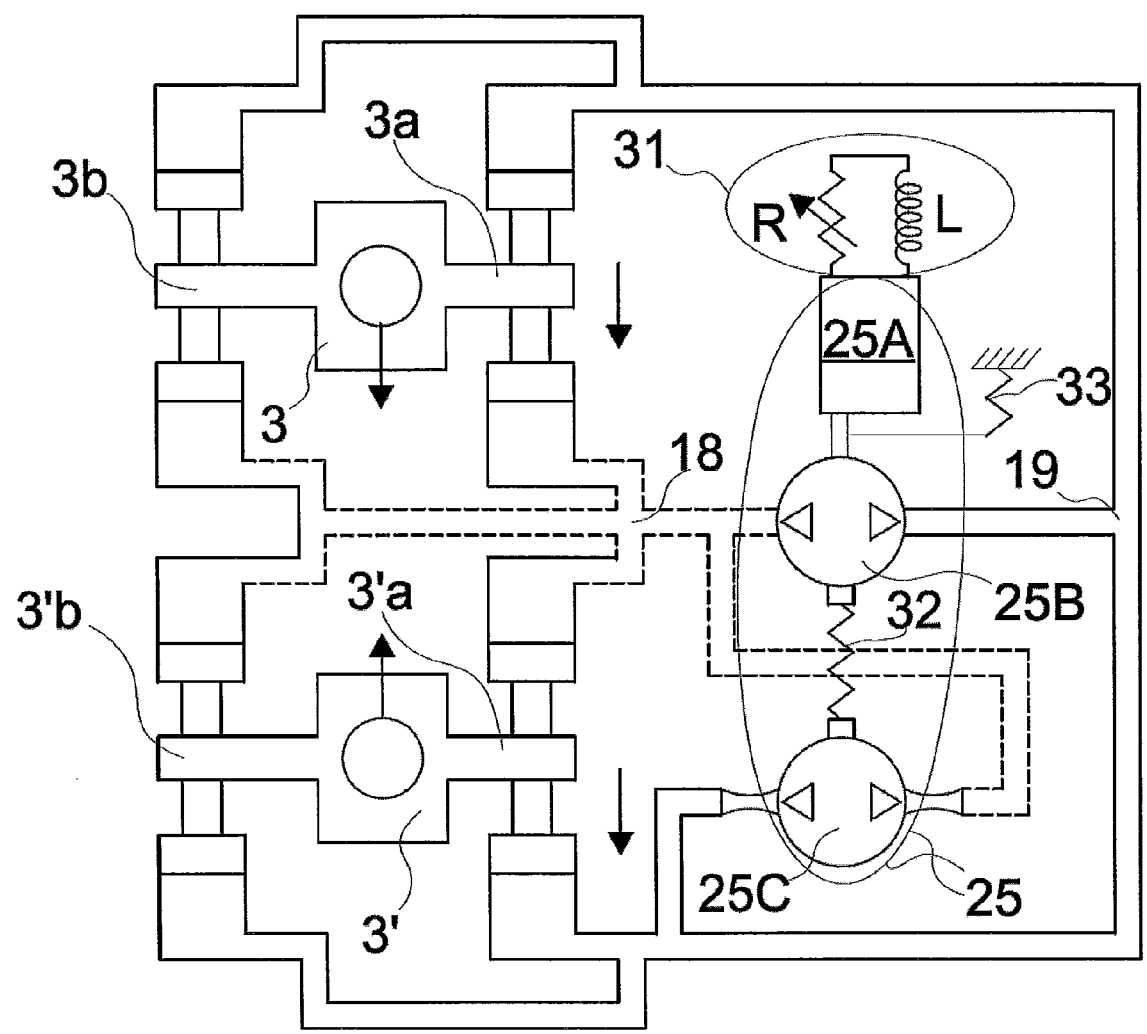
FIGS. 7, 8 and 9 show schematically, according to the present invention, preferred embodiments of the invention in combination with the previous diagrams in FIGS. 5 and 6.

This provides for the presence of velocimeters connected to the fittings of the rollers and a control system that, based on signals from the velocimeters, controls the impedance characteristics of the resistive-inductive circuit to which are connected the windings of the electric motor defining the electro-hydrostatic actuator in FIG. 7. In this case, the damping system is also passive, because the electric motor(s) is/are not powered to dampen the chatter.

Fourth Variant

Figure 9:
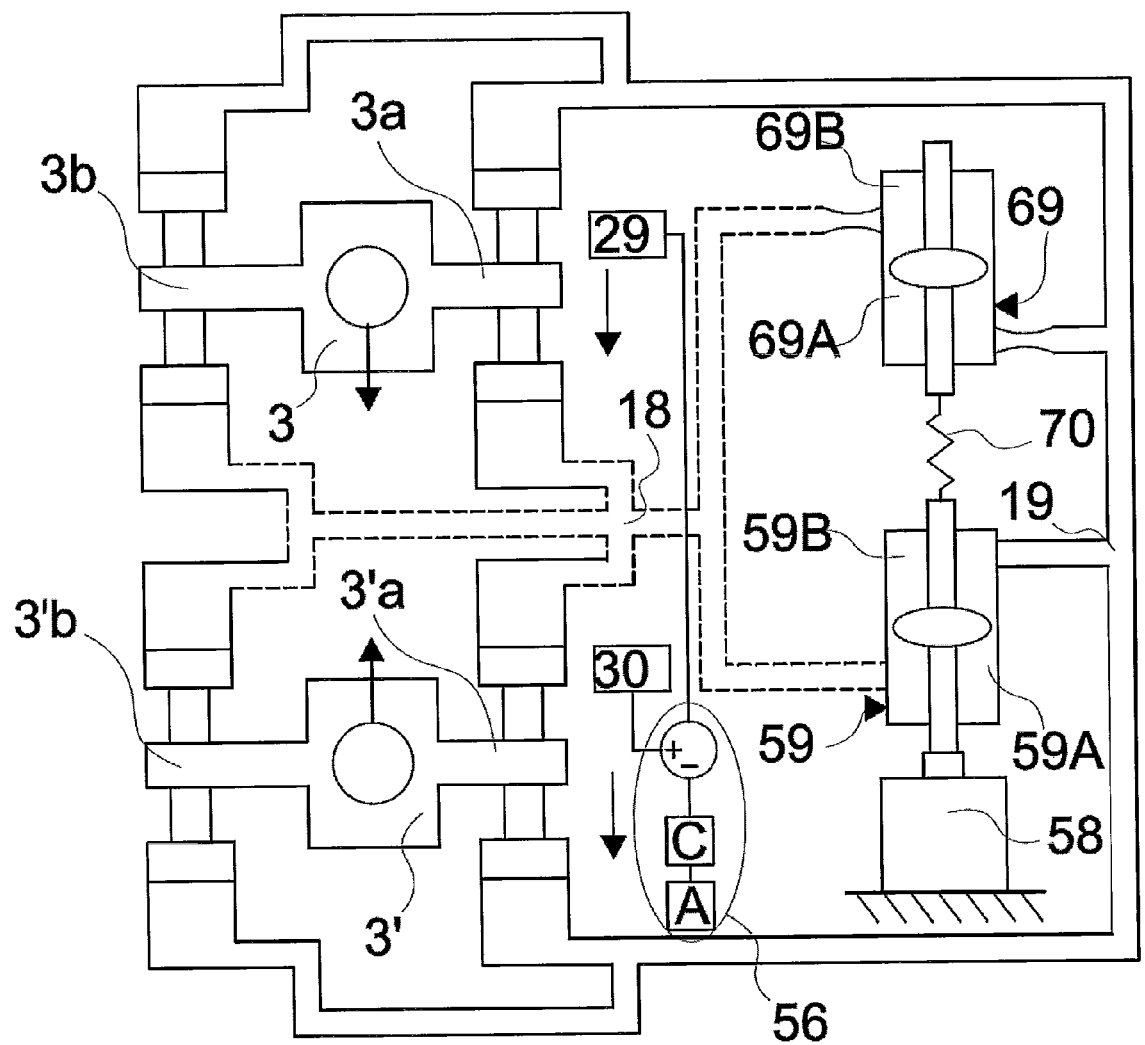
Figure 10E:
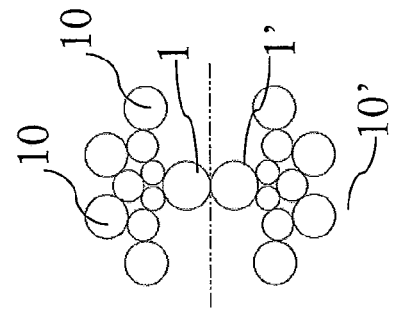
FIGS. 10*a*-10*e* show arrangements of rolling cages to which the present invention can be applied.
Figure 10D:
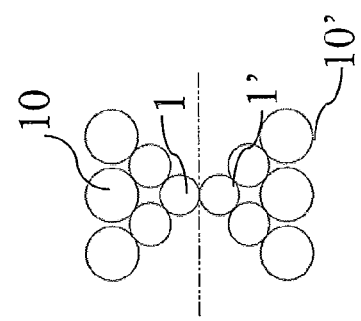
Figure 10C:
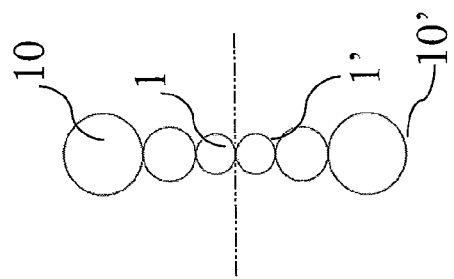
Figure 10B:
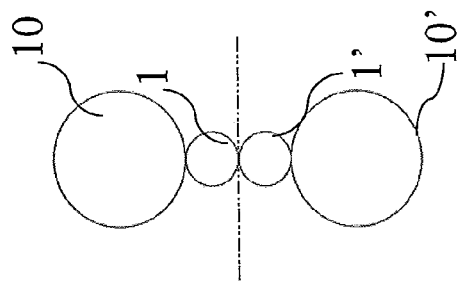
Figure 10A:
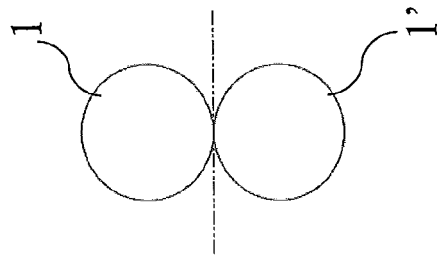

With reference to FIG. 9, an active variant of the invention provides for velocimeter 29 and 30 being installed on the fittings 3 and 3' of the rollers 1 and 1' to measure the deviation/speed of the fittings of the rolling cylinders in three directions, with particular reference to the vertical component with respect to the rolling plane. Such measurements generate an electrical input signal that defines an error for a control system 56, which generates an output signal, possibly amplified by an amplifier A, to feed and control, in a closed loop, a piezoelectric actuator 58, connected to the shaft of a first hydraulic cylinder 59.

The first hydraulic cylinder 59 is of the dual-chamber type, and the first chamber 59A is connected hydraulically to one of said manifolds 18 and 19, for example, the manifold 18, and the other chamber 59B is connected hydraulically to the other manifold, for example 19.

A second hydraulic cylinder 69 is of the dual-chamber type, and is connected in the opposite direction than the first hydraulic cylinder 59, such that the shafts of the two cylinders move in opposite directions under the effect of an overpressure in one manifold with respect to the other manifold.

Since said shafts are connected to one another by a suitable spring 70, they remain motionless under the effect of a stable pressure difference between the two manifolds.

The chatter vibrations are detected by the control system 56 which controls the displacement of said piezoelectric actuator 58 such that the motion of the shaft of the first cylinder 59, connected to the piezoelectric actuator 58, is opposed to high-frequency pressure waves, thus damping them. Therefore, by controlling said piezoelectric actuator 58 appropriately, it is possible to generate a damper Fs that cancels out said force Fv measured through said velocimeters 29 and 30.

An additional piezoelectric actuator may be provided that is connected to the shaft of the second hydraulic cylinder 69 such as to work in opposition to the other piezoelectric actuator 69.

Since the two hydraulic cylinders are connected oppositely, the result is that the two piezoelectric actuators work in unison in damping the chatter.

Figure 3:
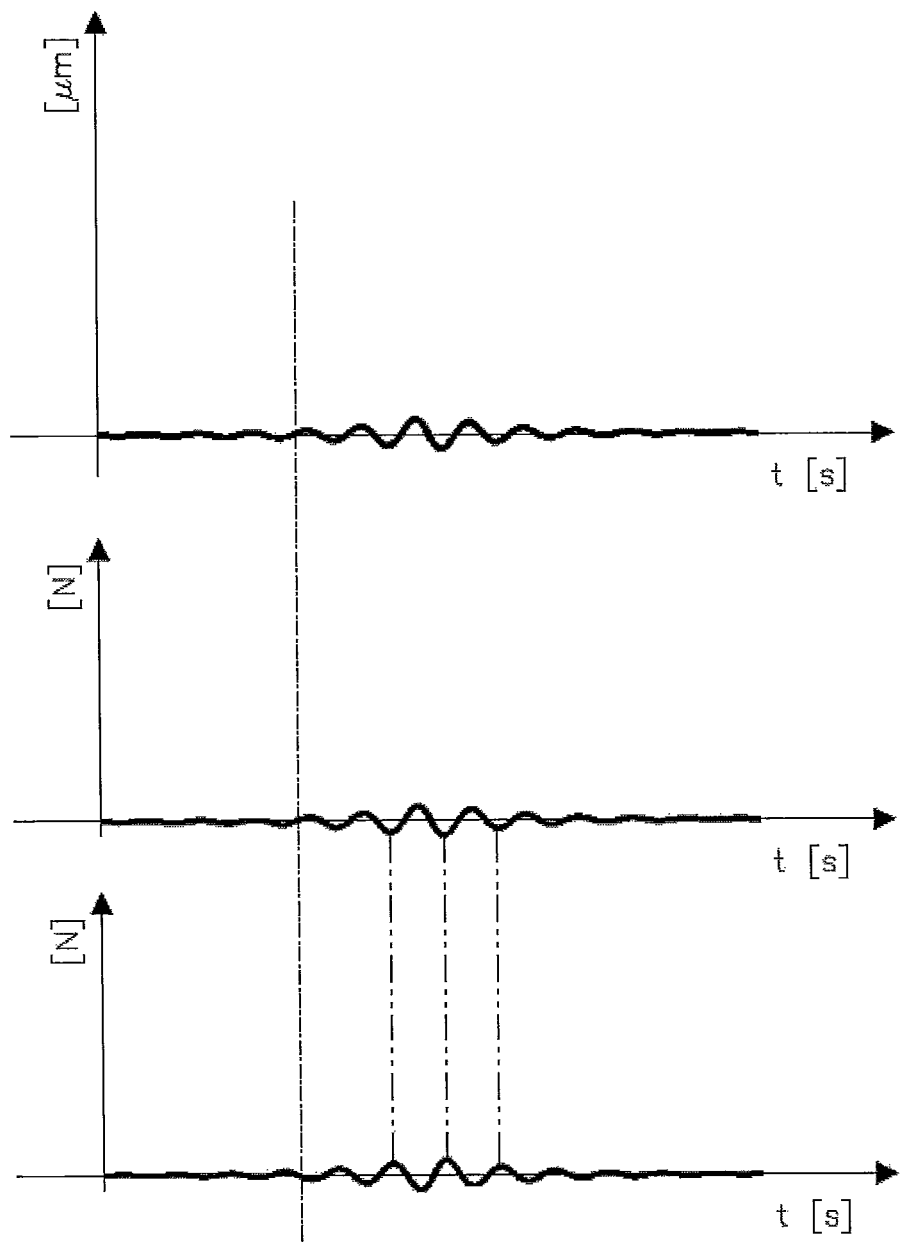
FIG. 3 shows schematically, according to the present invention, further examples of three graphics, in which are shown, from above, a variation in thickness of a tape rolled over time, a trend of a force over the same time that determines said variation in thickness and a trend of a damping action intended to eliminate the effect of said force.

Advantageously, the invention resolves the above problem of chatter by generating a damping force Fs, in phase opposition with respect to the force Fv that is generated during a rolling process and that defines said resonance vibrations. The result of the application of this damping effect is shown in FIG. 3. This figure shows, in summary form, three graphs that are synchronous over time: the uppermost graph shows a tolerance variation of the thickness of a tape rolled over time; the graph immediately below shows the trend of a force Fv, and the graph at the bottom shows the trend of a damper Fs.

It can be seen, in said FIG. 3, that at the point of onset of the vibration, the displacement of a roller tends to move outside the tolerance of +/−2 μm, while the damper Fs in phase opposition with respect to the force Fv, reduces or eliminates the displacement of the roller by returning it to within said +/−2 μm.

A novel rolling mill according to the present invention may comprise a device for controlling the bending actuators, connected to velocimeters installed on the fittings of the rollers to control the solenoid valves slaved to the recovery actions of the flatness of the tape and to control the chatter damping system.

Such damping devices can advantageously be applied to all systems for the bending of rollers that are known in the prior art and reported by way of example in FIG. 10.

The present invention has been described with reference to an E-block arrangement, but the fact remains that it can readily be adapted to different arrangements by the person skilled in the art.

In addition, the possible arrangements of cages shown in FIG. 10 are only illustrative and are supplied by way of non-limiting example.

The elements and characteristics illustrated in the different preferred embodiments may be combined without, however, going beyond the scope of protection of this application.

The invention claimed is:

1. A vibration damping system of a rolling mill comprising at least a rolling stand having rollers and a bending adjustment system of the rollers, the vibration damping system comprising:
   hydraulic actuators acting on said rollers for adjusting the reciprocal position between the rollers,
   hydraulic circuits for feeding said hydraulic actuators,
   hydraulic damping means connected to said hydraulic circuits for actuating a damping force by means of said hydraulic actuators,
wherein
said hydraulic damping means comprise:
   a first passive hydraulic element comprising a respective mobile part, connected between said hydraulic feeding circuits, a second passive hydraulic element comprising a respective mobile part, connected between said hydraulic feeding circuits in opposite manner with respect to said first passive hydraulic element, a first elastic element connecting said respective mobile parts of said first and second passive hydraulic elements with each other, at least one electrodynamic damping device rigidly connected to one of said mobile parts of said first or second passive hydraulic element.

2. A system according to claim 1, wherein each of said passive hydraulic elements is a hydraulic pump and wherein
said electrodynamic damping element comprises an electric motor,
said rigid connection, between the electric motor and said mobile parts of said first or second passive hydraulic element, is connected with the ground by means of a second elastic element.

3. A system according to claim 2, further comprising a passive ohmic-inductive circuit electrically connected to the windings of said electric motor.

4. A system according to claim 3, further comprising:
vibration measuring means of the rollers,
processing means connected to said vibration measuring means and configured to control the impedance properties of said passive ohmic-inductive circuit.

5. A system according to claim 2, further comprising:
vibration measuring means of the rollers,
processing means connected to said vibration measuring means and configured to feed said electric motor so as to damp the vibrations of the rollers.

6. A system according to claim 1, wherein said first elastic element is a torsion spring.

7. A system according to claim 1, wherein:
each of said passive hydraulic elements comprises a hydraulic cylinder (of the double chamber type, a chamber of which is connected with a positive hydraulic circuits of the bending adjustment system of the rollers and another chamber is connected with a negative hydraulic circuits of the bending adjustment system of the rollers
said electrodynamic device is a piezoelectric actuator
and further comprising:
vibration measuring means of the rollers,
processing means connected with said vibration measuring means and feeding said piezoelectric motor so as to damp the vibrations of the rollers.

8. A rolling mill comprising a vibration damping system according to claim 1.

* * * * *